United States Patent Office 2,797,406
Patented June 25, 1957

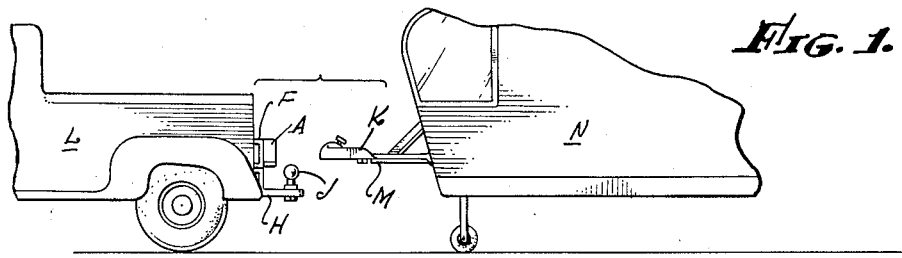
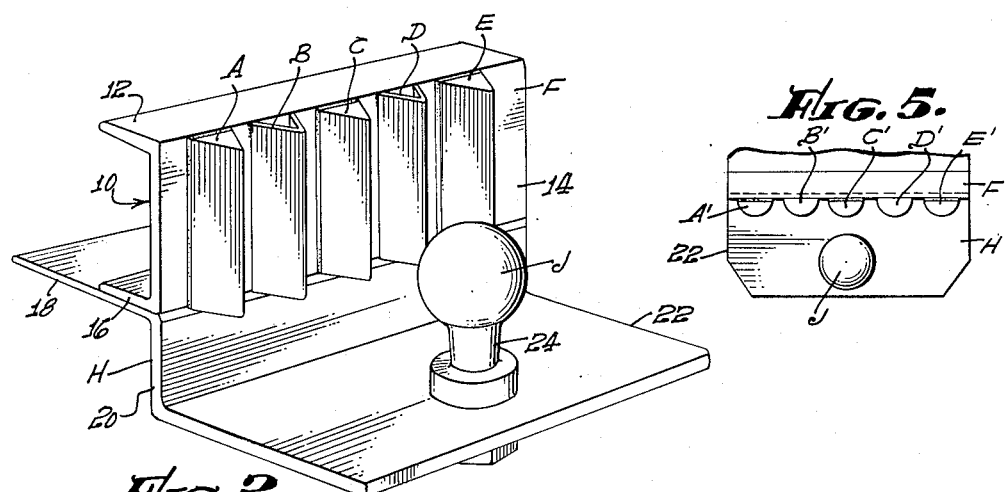
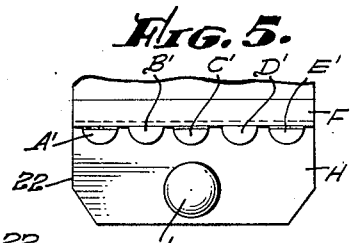
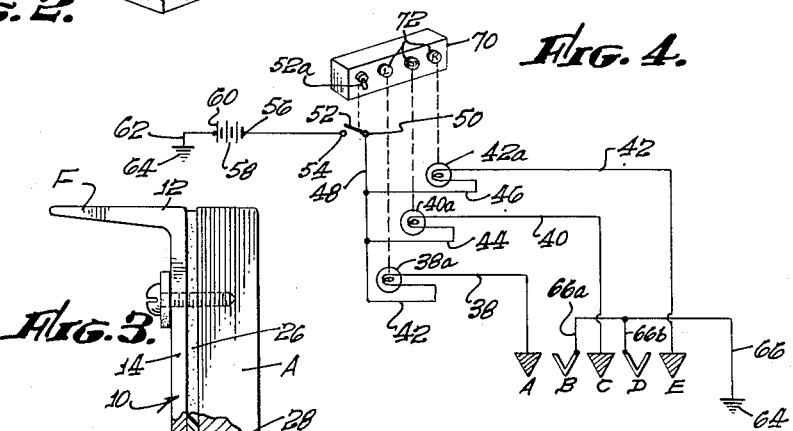
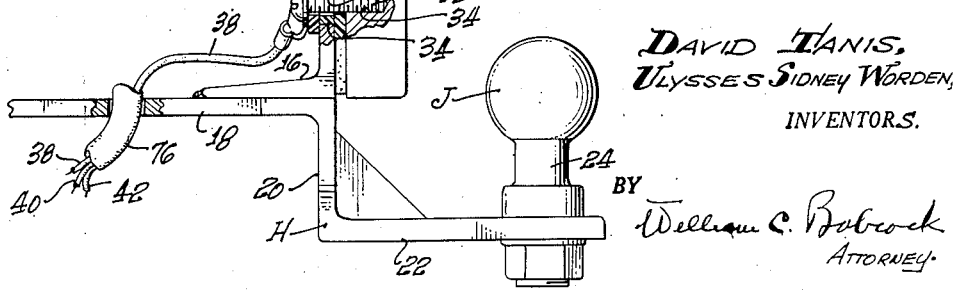

2,797,406

ALIGNMENT DEVICE FOR TRAILER

David Tanis and Ulysses Sydney Worden,
Long Beach, Calif.

Application June 14, 1956, Serial No. 591,403

8 Claims. (Cl. 340—282)

The present invention relates generally to the field of automotive accessories, and more particularly to an indicating device that informs the driver of an automobile or truck when the ball portion of a trailer hitch is in vertical alignment with the socket portion of the hitch to permit their interconnection.

The primary purpose in devising the present invention is to provide an electrically actuated device which visually or audibly indicates to a driver of a truck or automotive vehicle when the ball portion of a conventional trailer hitch is in vertical alignment with the socket portion thereof affixed to the trailer to permit lowering of the socket portion into engagement with the ball.

A major object of the invention is to substantially eliminate the inconvenience encountered by the driver in attempting to back a truck or automotive vehicle into a position where the unseen ball portion of a trailer hitch is in alignment with the socket portion of the hitch affixed to the trailer.

Another object of the invention is to provide a compact device that at all times remains in position on the portion of the trailer hitch affixed to the truck or automotive vehicle which is of extremely simple mechanical structure, requires no elaborate plant facilities for its production, is fabricated from standard, commercially available materials, and can be retailed at a sufficiently low price as to encourage its widespread use.

Another object of the invention is to provide a device of the nature above described that can be easily mounted on or removed from the ball-supporting portion of the trailer hitch by persons having limited mechanical ability, and once installed, is substantially foolproof in operation.

These and other objects and advantages of the invention will become apparent from a description of a preferred and an alternate form thereof when taken in conjunction with the accompanying drawing illustrating those forms, in which:

Figure 1 is a side elevational view of the invention shown mounted on an automotive vehicle;

Figure 2 is an enlarged perspective view of the invention shown mounted on the ball-supporting portion of a trailer hitch;

Figure 3 is a side elevational view of the invention showing the electrical wiring connection thereto;

Figure 4 is a schematic wiring diagram of the electrical circuit associated with the invention; and Figure 5 is a plan view of an alternate form of the device.

Referring now to the drawing for the general arrangement of the invention, it will be seen that a number of vertically disposed, laterally separated electrical conducting members A, B, C, D and E are mounted on the rear face of a support F that is removably affixed to the ball-supporting portion H of a trailer hitch which embodies a ball J and socket-defining member K. The ball-supporting member H is affixed to the truck or automotive vehicle L in a conventional manner. Likewise, the socket-defining portion K of the hitch is affixed to the tongue M of a trailer N as is customary in hitches of this type.

Support F may be fabricated in a number of different shapes, but it has been found convenient to employ a length of channel iron 10 that includes an upper flange 12, a vertically extending web 14 and a lower flange 16. Support H preferably includes a rearwardly extending plate 18 that is affixed to the vehicle L by conventional means such as welding, or the like, and the rear end of this plate develops into a downwardly depending member 20 from which a second plate 22 extends rearwardly. Flange 16 of the channel iron 10 is welded or otherwise rigidly affixed to the upper rearward surface of plate 18, as best seen in Figure 2.

The second plate 22 has a centrally disposed bore formed therein that is engaged by a rod 24, the upper portion of which supports the ball J. The electrical conducting members A, C and E are separated from web 14 by sheets 26 of an electrical insulating material such as rubber, synthetic plastic, or the like. Two vertically spaced bores 28 are provided in web 14 as well as each member A, C and E, and each of these bores have an electrical insulating member 30 disposed therein through which a screw 32 projects rearwardly to engage a tapped bore 34 formed in one of the members A, C or E. Screws 32 not only serve to support members A, C and E on the rear face of web 14, but also as a means to connect these members to electrical conductors 38, 40 and 42, respectively. Electrical conducting members B and D can be welded, or otherwise rigidly affixed to web 14 in such a manner that they are in electrical communication therewith.

Conductors 38, 40 and 42 are connected to one of the terminals of incandescent lamps 38a, 40a and 42a, respectively, as shown in Figure 4. The other terminals of these lamps are connected to conductors 42, 44 and 46, respectively, and the latter three conductors are in turn connected to a common electrical conductor 48 that leads to one terminal 50 of a manually operated switch 52. The other terminal 54 of switch 52 is connected to one terminal 56 of a battery 58 which is connected by an electrical conductor 62 to ground 64. Members B and D are joined to an electrical conductor 66 that extends to ground 64 either directly or through electrical conducting members 66a and 66b, as shown in Figure 4.

Should it be desired, the incandescent lamps 38a, 40a and 42a can be positioned within the confines of a small cabinet 70, such as shown in Figure 4, which may be mounted on the dashboard of the automobile, or in any other convenient location thereon, with the lamps being visible through windows 72 formed in the cabinet. Also if desired, the actuating portion 52a of the switch 52 may project from the cabinet as shown. For convenience in orienting the positioning of ball J relative to socket K as the vehicle L is backed up, the three windows 72 shown in cabinet 70 may be identified by the words "left," "center" and "right," or as shown in Figure 2, these notations can be abbreviated by the letters "L," "CTR" and "R" and imprinted above or below the appropriate windows 72. For convenience in handling the wiring of the invention on the vehicle, cables 38, 40 and 42 may be incorporated in a single cable 76 as shown in Figure 3.

In use, the operation of the invention is extremely simple. After the apparatus has been installed on the vehicle L as above described, the ball J may be so positioned as to engage socket portion K of the hitch by backing the vehicle rearwardly until the outer extremity of tongue M engages the space defined between two of the electrical conductors A, B, C, D or E. In the event the socket-engaging portion K contacts the space between the electrical conducting members A and B, and assuming that switch 52 is closed, the incandescent bulb 38a will be illuminated to indicate that the socket portion K is too far left of the ball J to engage same when the tongue M is lowered. It will therefore be necessary for the driver of the vehicle L to back up and so manipulate the vehicle that the ball J is moved to the right toward socket portion K, and when he has properly positioned the vehicle to bring the socket portion K into vertical alignment with ball J, the socket will engage the space between either the members B and C, or C and D, which will indicate that the tongue M can be lowered to position it on the ball. However, if the driver of the vehicle should not back the vehicle far enough to the right, socket portion K would engage the space between the conducting members D and E, indicating that further movement to the right was still required in order to bring the socket portion K and ball J into vertical alignment.

If desired, the alternate form of the invention shown in Figure 5 may be utilized, which is identical to the preferred form except that electrical conductors A', B', C', D' and E' are of semi-circular horizontal cross section rather than the triangular cross section shown in the preferred form of the device.

The use and operation of the invention have been described in detail and need not be repeated herein.

Although the forms of the invention herein shown and described are fully capable of achieving the objects and providing the advantages hereinbefore mentioned, it is to be understood that they are merely illustrative of the presently preferred embodiment and an alternate embodiment of the device and that we do not mean to be limited to the details of construction herein shown and described other than as defined in the appended claims.

We claim:

1. A device for use in indicating when the vehicle-supported ball portion of a trailer hitch is disposed under the socket portion thereof affixed to the tongue of a trailer including: a metallic member having a vertically disposable rigid surface; means for supporting said member relative to said ball at least partially above, on both the left and right hand sides of said ball, and forwardly thereof; a plurality of first vertically disposed, laterally separated electrical conducting elements mounted on said member; a plurality of second vertically disposed electrical conducting elements mounted on said member between said first elements and laterally separated therefrom; electrically actuated indicating means which indicate when said socket is over, to the right, or to the left of said ball; a plurality of normally open electrical circuits connected to said indicating means, said first element and said second element, with one of said circuits being completed upon said socket contacting one of said first elements and one of said second elements to actuate said indicating means and indicate the position of said socket relative to said ball when said socket contacts one of said first elements and one of said second elements; and a switch in said circuit that can be opened to break said completed circuit after said indicating means has been actuated.

2. A device as defined in claim 1 in which said means for supporting said member is the ball-supporting portion of the trailer hitch affixed to said vehicle.

3. A device as defined in claim 2 in which said member is a piece of channel iron having two horizontally disposed flanges and a vertically positioned web with the lowermost of said flanges being rigidly affixed to said ball-supporting member and extending forwardly relative thereto.

4. A device as defined in claim 3 in which said first elements are rigidly affixed to said channel iron.

5. A device as defined in claim 4 in which said second elements are separated from said channel iron by electrical insulators.

6. A device as defined in claim 5 in which said first and second elements are of horizontal triangular cross-section.

7. A device as defined in claim 5 in which said first and second elements are of horizontal semicircular cross-section.

8. A device as defined in claim 5 in which said indicating means are a plurality of incandescent electric bulbs.

References Cited in the file of this patent
UNITED STATES PATENTS

| | | |
|---|---|---|
| 2,256,120 | Lovenston | Sept. 16, 1941 |
| 2,439,423 | Fowler | Apr. 13, 1948 |
| 2,736,885 | Thompson | Feb. 28, 1956 |
| 2,762,995 | Gilbert | Sept. 11, 1956 |